United States Patent [19]

Yoshida et al.

[11] Patent Number: 4,899,935
[45] Date of Patent: Feb. 13, 1990

[54] VALVE SUPPORT FOR ACCUMULATOR TYPE FUEL INJECTION NOZZLE

[75] Inventors: Takeo Yoshida; Hajime Kishida, both of Iwata, Japan

[73] Assignee: Yamaha Hatsudoki Kabushiki Kaisha, Iwata, Japan

[21] Appl. No.: 319,999

[22] Filed: Mar. 7, 1989

[30] Foreign Application Priority Data

Mar. 14, 1988 [JP] Japan .................................. 63-58177

[51] Int. Cl.⁴ .......................................... F02M 47/02
[52] U.S. Cl. .................................... 239/91; 239/533.8
[58] Field of Search .................................... 239/88–92, 239/533.3–533.9, 585

[56] References Cited

U.S. PATENT DOCUMENTS

| | | | |
|---|---|---|---|
| 4,006,859 | 2/1977 | Thoma | 239/89 |
| 4,718,635 | 1/1988 | de Concini et al. | 239/585 X |

FOREIGN PATENT DOCUMENTS

| | | | |
|---|---|---|---|
| 228578 | 7/1987 | European Pat. Off. | 239/88 |
| 3204961 | 9/1983 | Fed. Rep. of Germany | 239/88 |
| 03836865 | 8/1987 | Switzerland . | |
| 651158 | 3/1947 | United Kingdom | 239/89 |

Primary Examiner—Andres Kashnikow
Assistant Examiner—Kevin P. Weldon
Attorney, Agent, or Firm—Ernest A. Beutler

[57] ABSTRACT

An accumulator type of fuel injection nozzle including an improved arrangement for slidably supporting the actuator end of the injection valve within the control chamber that controls the opening and closing of the injection valve. This is accomplished by providing a closure plate that has a large diameter bore that supports an enlarged diameter end portion of the injection valve. The bore is closed by a slidably supported supporting plate that has a smaller diameter bore which engages the control valve adjacent its larger diameter portion and slidably supports it.

3 Claims, 2 Drawing Sheets

VALVE SUPPORT FOR ACCUMULATOR TYPE FUEL INJECTION NOZZLE

BACKGROUND OF THE INVENTION

This invention relates to an improved accumulator type fuel injection nozzle and valve and valve actuator for such a nozzle.

A well known and popular type of fuel injection nozzle is the so-called accumulator type. With this type of fuel injection nozzle there is provided a housing that defines an accumulator chamber that is charged with fuel under pressure. The flow controlling injection valve of the nozzle has an actuator portion that is mounted within a small control chamber that is also pressurized with fuel under pressure. When it is desired to inject fuel, the pressure in the control chamber is rapidly reduced by opening a relief valve for that chamber and the pressure in the accumulator chamber opens the injector valve and permits the fuel to be discharged.

With this type of device, the actuator normally is formed integrally with the injector valve and is slidably supported within a bore that defines the control chamber. Obviously, it is desirable to provide a large diameter for the actuator portion of the injection valve so as to insure relatively high pressures acting on the injector valve from the control pressure chamber to hold the valve in its closed position. Normally, conventional systems require relatively heavy springs for holding the injector valve in its closed position and this has a number of disadvantages.

However, when a large diameter actuator portion is provided, it is difficult to assemble the complete mechanism. The reason for this is that the controlling portion of the injection nozzle is relatively small in size and when all of the parts are assembled, the clearances associated with large diameter actuator portions makes it difficult to insure smooth valve operation at a reasonable cost.

It is, therefore, a principal object of this invention to provide an improved actuator arrangement for the valve of an accumulator type fuel injection nozzle.

It is a further object of this invention to provide an improved supporting arrangement for the actuator portion of the injector valve that permits large diameters to be utilized while at the same time minimizing assembly problems and cost.

SUMMARY OF THE INVENTION

This invention is adapted to be embodied in an accumulator type injection nozzle that is comprised of an outer housing of an accumulator chamber that is adapted to be supplied with high pressure fuel. A nozzle port leads from the accumulator chamber and an injection valve is moveable between a closed position and an open position for controlling the discharge of fuel from the accumulator chamber through the nozzle port. A control chamber is also incorporated that receives pressurized fuel and an actuating member is supported for movement within the control chamber and is associated with the injector valve for retaining the injector valve in its closed position when the control chamber is pressurized and for movement of the injector valve to its open position when pressure is relieved in the control chamber. A relief valve means is moveable between a closed position for maintaining pressure in the control chamber and an opened position for relieving pressure in the control chamber for effecting fuel discharge through the nozzle port. In accordance with the invention, the control chamber is defined by a portion of the outer housing that defines a bore. The actuating member is comprised of an enlarged diameter portion of the injector valve that is slidably supported in the outer housing bore. A supporting member is slidably engaged with a face of the outer housing at the end of the bore facing the accumulator chamber and which closes the bore. The supporting member has a supporting bore that slidably supports a smaller diameter portion of the injection valve adjacent its large diameter portion.

DETAILED DESCRIPTION OF THE PREFERRED EMBODIMENT OF THE INVENTION

Figure 1:
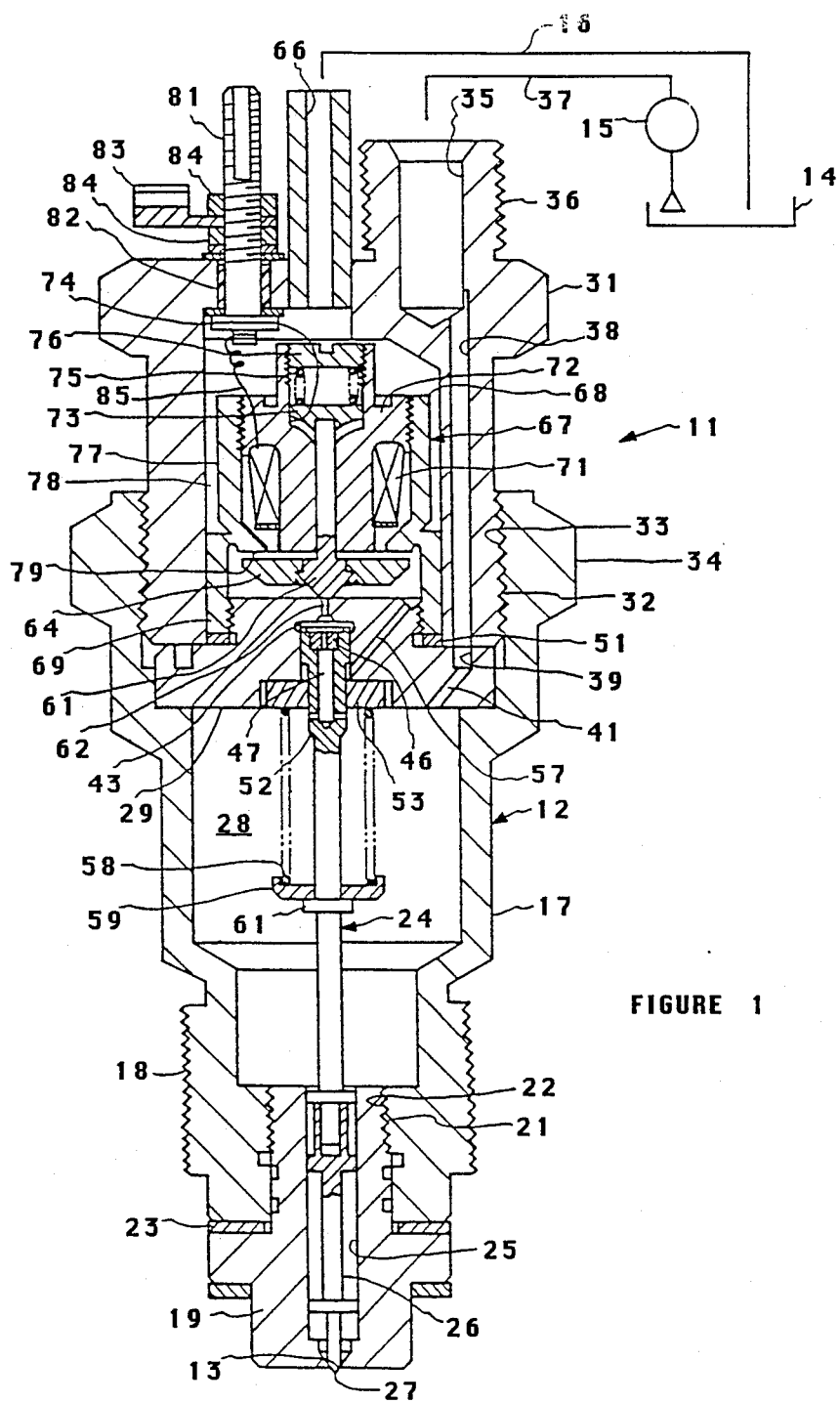
FIG. 1 is a cross-sectional view of a fuel injection nozzle constructed in accordance with an embodiment of the invention and shown in a fuel system which is depicted schematically.
Figure 2:
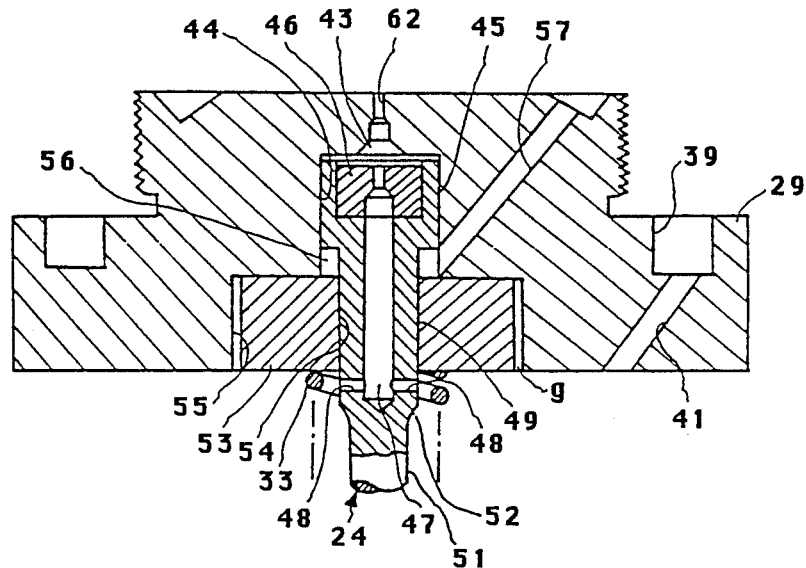
FIG. 2 is a top plan view of the fuel injection nozzle.

Referring to the drawings, a fuel injection nozzle constructed in accordance with an embodiment of the invention is identified generally by the reference numeral 11. The injection nozzle 11 is comprised of an outer housing assembly, indicated generally by the reference numeral 12 that is adapted to be mounted, in a manner to be described, in the cylinder head of an internal combustion engine with a nozzle port 13 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

Fuel is supplied to the injection nozzle 11 from a remotely positioned fuel tank 14 by means of a high pressure pump 15. Excess fuel is returned back to the reservoir 14 through a return line 16. The fuel delivery and return systems per se form no part of the invention and, for that reason, they have been illustrated only schematically.

The outer housing 12 is comprised of a lower piece 17 that has a threaded lower end 18 that is adapted to be threaded into a suitable aperture in the cylinder head of the associated engine (not shown) in a known manner. The nozzle port 13 is defined by a tip 19 that has a threaded portion 21 that is received in a threaded bore 22 formed at the lower end of the housing piece 17. An adjusting shim 23 is interposed between the nozzle piece 19 and housing 17 for length adjustment.

An injection valve 24 is slidably supported within a bore 25 of the nozzle piece 19 and has a reduced diameter portion 26 and a flow controlling tip 27 which, in the closed position, closes the injection nozzle port 13. The valve portion 26 has interrupted enlargements for slidably supporting the injection valve 24 in the bore 25 in a known manner.

An accumulator chamber 28 is formed above the bore 25 by the housing piece 17. The accumulator chamber 28 is closed at its upper end by means of a closure plate 29 that is held against a shoulder in the housing piece 17 by a second housing piece 31. The housing piece 31 has a threaded portion 32 that is received within a threaded bore 33 of the housing piece 17 so as to hold the closure plate 29 in position and maintain the chamber 28 in a sealed condition, except as is hereinafter noted. Externally of the threaded opening 33, the housing piece 17 is formed with a hexagonal portion 34 so as to facilitate its insertion into the threaded bore of the cylinder head.

The housing piece 31 is formed with an inlet conduit 35 that has a threaded external portion 36 so as to receive a fitting for connecting a supply line 37 extending from the pressure pump 15 to the inlet conduit 35.

The inlet conduit 35, which is generally a drilled opening, is intersected by a further drilled passageway 38 that extends axially along the housing piece 31 at one side thereof and which communicates at its lower end with a corresponding circumferential groove 39 formed in the upper face of the closure plate 29. The groove 39 is intersected by a passage 41 which delivers fuel under pressure to the accumulator chamber 28.

A control chamber 43 is formed in the closure plate 29 by means of a bore 44 that extends toward the lower end of the closure plate 29. The injection valve 24 has a large diameter generally cylindrical actuator portion 45 that is slidably supported within the bore 44 and which closes the lower end of the control chamber 43. A restricted orifice 46 fixed in the end of the actuator portion 45 communicates an axial passage 47 of the portion 45 and radial port 48 with the accumulator chamber 28. The control chamber 43 communicates with the orifice 46 to receive the pressurized fluid and normally urge the injection valve 24 toward its downward or closed position.

Normally, the enlarged diameter portion 45 of the injector valve 24 will be slidably supported directly by the closure plate 29. However, it is desirable to maintain a large bore for the diameter 44 and a large diameter for the portion 45. However, it is necessary that the flow controlling portion 27 of the injector valve 24 be accurately aligned with the bore 44 in order to insure smooth movement. However, this is very difficult when large diameters are employed and assembly and installation can become quite a problem. In order to avoid this, the injection valve 24 is provided with a portion 49 of a diameter that is smaller than the diameter of the portion 45 but which is larger in diameter than a shank portion 51 of the injection valve 24. The portions 49 and 51 are connected by a rounded section 52 so as to relieve stresses.

A supporting member, indicated generally by the reference numeral 53 and which may have a generally annular shape, is formed with a bore 54 that is complementary to the injection valve portion 49 so as to provide sliding support for it. However, the supporting member 53 is received within an enlarged diameter cylindrical recess 55 formed in the closure plate 29 so as to provide a gap g around this member. As a result, the supporting plate 53 may move transversely to accommodate alignment and, at the same time, sealingly engage a portion 56 formed in the bore 44 below the enlarged diameter portion 45. This area 56 is vented to return pressure through a return line 57 so that the higher pressure acting in the control chamber 43 will be sufficient to hold the injection valve 24 in its closed position due to the different forces provided for by the smaller effective area of the portion 49 from the portion 45. As a result, the pressure in the control chamber 43 is, by itself, sufficient to maintain the injection valve 26 in a seated position within the nozzle port 43.

Even though this pressure sealing may be adequate, if desired, a coil compression spring 58 may be provided that encircles the injection valve 24 and bears against the support member 53 at its upper end. The lower end of the spring 58 engages a cup shaped retainer 59 that is held axially in position against a shoulder formed by an enlargement 61 on the inejction valve 24 so as to further assist in maintaining the injection valve 24 in the closed position as shown in the drawings. The spring 58 also holds the supporting plate 53 in sealing relation with the portion of the closure plate surrounding the bore 44. However, the pressure difference across the supporting member 53 is sufficient that the spring 58 need not be necessary.

Figure 3:
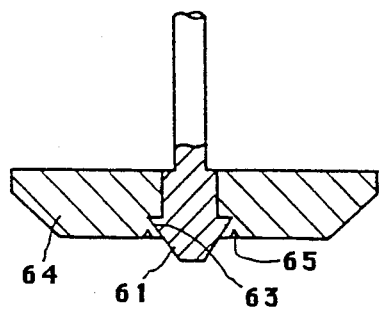
FIG. 3 is an enlarged cross-sectional view showing the relief valve.

A relief valve 61 is supported within the upper end of the closure plate 29 and controls the opening of a relief valve seat 62 formed in the upper end of the closure plate 29 and communicating with the control chamber 43. The relief valve 61 comprises a headed portion that is received within a corresponding recess 63 formed in an enlarged disk like armature plate 64. The relief valve 61 is held in this recess 63 by upsetting a portion of the armature plate 64 around the valve 61 as shown at 65 in FIG. 3. The relief valve 61 is biased toward its closed position with the valve seat 62 in a manner to be described.

The relief valve 61 when opened will permit the fuel in the control chamber 43 to return to the tank 14 through a return fitting 66 that extends axially through the end of the housing piece 31 parallel to the inlet passageway 35. The return passageway 66 communicates with the conduit 16. Fuel can flow from the relief valve seat 62 to the return passageway 66 through suitable internal passageways or clearances to permit this return flow, which is relatively small in volume.

The relief valve 61 is opened and closed so as to control the discharge of fuel from the nozzle port 13 by means of an electromagnetic assembly, indicated generally by the reference numeral 67. This electromagnetic assembly 67 includes a generally cylindrical yoke 68 that has a threaded opening at an enlarged diameter lower end portion 69 which is received on a threaded portion of the closure plate 29 so as to secure the electromagnetic assembly 67 in position.

The electromagnetic assembly 67 is comprised of a solenoid coil or winding 71 that is disposed at the lower end of the housing or yoke 68 and which encircles an armature 72. The armature 72 is formed with a bore that slidably supports an extension of the relief valve. An enlarged portion 73 is affixed to the upper end of the relief valve extension 64 and is received within a counter bore 74 formed in the upper end of the armature 72. A coil compression spring 75 is received in this counter bore and is preloaded by means of an adjustable screw 76 so as to apply a preset closing biasing force on the relief valve 61 so as to hold it in the closed position as aforenoted.

The yoke 68 of the electromagnet 67 has an upper portion 77 which is also cylindrical in shape but which is reduced in diameter from the mounting portion 69 and is of substantially lesser diameter than the bore of the housing piece 31 in which it is received. This provides a clearance 78 which will prevent the transmission of stray flux paths to the housing 12.

The yoke parts 69 and 77 are connected to each other by means of an intermediate part 79 that extends radially inwardly in proximity to the lower end of the winding 71 and immediately above the armature 64 of the relief valve 61. This provides a concentrated flux path between the armature 72 of the electromagnet 67 and the armature 64 of the relief valve 61. In order to reduce the transmission of flux to the housing piece 31, the intermediate portion 79 is provided with weakened or reduced portions that interconnect it to the remaining components so as to provide the aforenoted result.

A circuit is provided for energizing the coil 71 of the electromagnet assembly 67 for opening and closing the relief valve 61. This circuit includes a pair of terminal posts 81 (only one of which appears in the drawings) that extend through the upper end of the housing piece 31 with an insulating sleeves 82 being interposed between the housing piece 31 and the terminal posts 81. Electrical tab connectors 83 are held on the posts 81 in electrical contact with them between a respective pair of nuts 84 so as to afford attachment to an appropriate lead of a circuit (not shown). A wire 85 is connected to the post 81 to complete the connection to the winding 62.

The condition shown in FIG. 1 is that which occurs when the winding 71 is deenergized. When the winding 71 is deenergized the relief valve 51 will be held in its closed position by the spring pressure difference on the injector valve 24 and by the 58, if used, so that the accumulator chamber 28 and control chamber 43 may be pressurized.

At the appropriate instant for fuel injection to begin, which may be controlled in any suitable strategy, the winding 71 is energized. When this happens, the relief valve armature 64 will be attracted upwardly by the flux in the armature 72 so as to open the relief valve 61 against the action of the spring 75. The pressure in the control chamber 43 will then be rapidly depleted and the higher pressure of the fuel acting in the accumulator chamber 28 will urge the injection valve 24 upwardly and permit fuel to issue from the nozzle port 13. Fuel charge is stopped by discontinuing the energization of the winding 71 so a to close the relief valve 61 and permit pressure in the control chamber 43 to again build up sufficiently to create a pressure difference to close the injection valve.

It should be readily apparent from the foregoing description that a very effective accumulator type injection nozzle has been provided in which high sealing pressures can be obtained while at the same time facilitating assembly and without necessitating high cost precision components. Although an embodiment of the invention has been illustrated and described, various changes and modifications may be made without departing from the spirit and scope of the invention, as defined by the appended claims.

We claim:

1. An accumulator type of injection nozzle comprised of an outer housing defining an accumulator chamber adapted to be supplied with high pressure fuel, a nozzle port leading from said accumulator chamber, an injector valve moveable between a closed position and an opened position for controlling the discharge of fuel from said accumulator chamber through said nozzle port, a control chamber for receiving pressurized fuel, an actuating member supported for movement within said control chamber and associated with said injector valve for retaining said injector valve in its closed position when said control chamber is pressurized and for movement of said injector valve to its opened position when pressure is relieved in said control chamber, and relief valve means moveable between a closed position for maintaining pressure in said control chamber and an opened position for relieving said control chamber for effecting fuel discharge through said nozzle port, the improvement comprising said control chamber being defined by a portion of said outer housing defining a bore, said actuating member comprising an enlarged diameter portion of said injection valve slidably supported within said bore, a supporting member slidably engaged with a face of said housing at the end of said bore facing said accumulator chamber and closing said bore, said supporting member having a supporting bore slidably supporting a smaller diameter portion of said injection valve adjacent said enlarged diameter portion.

2. An accumulator type of injection nozzle as set forth in claim 1 wherein the supporting member is received within a recess formed in the outher housing adjacent the bore.

3. An accumulator type of injection nozzle as set forth in claim 2 wherein the recess comprises a counter bore.

* * * * *